(12) United States Patent
Park et al.

(10) Patent No.: US 10,343,213 B2
(45) Date of Patent: Jul. 9, 2019

(54) METALLIC FOAM ANODE COATED WITH ACTIVE OXIDE MATERIAL

(71) Applicant: CellMobility, Inc., Berkeley, CA (US)

(72) Inventors: Hyeji Park, Seoul (KR); Hyelim Choi, Seoul (KR); Yumi Rho, Kyeonggi-do (KR); Heeman Choe, Kyunggi-do (KR)

(73) Assignee: CellMobility, Inc., Berkeley, CA (US)

( * ) Notice: Subject to any disclaimer, the term of this patent is extended or adjusted under 35 U.S.C. 154(b) by 361 days.

(21) Appl. No.: 15/215,541

(22) Filed: Jul. 20, 2016

(65) Prior Publication Data

US 2017/0021416 A1 Jan. 26, 2017

Related U.S. Application Data

(60) Provisional application No. 62/194,677, filed on Jul. 20, 2015, provisional application No. 62/194,564, filed on Jul. 20, 2015.

(51) Int. Cl.
*B22F 3/10* (2006.01)
*H01M 4/04* (2006.01)
(Continued)

(52) U.S. Cl.
CPC ............... *B22F 3/10* (2013.01); *B22D 15/00* (2013.01); *B22D 21/005* (2013.01); *B22D 25/005* (2013.01); *B22F 3/1143* (2013.01); *B22F 3/24* (2013.01); *B22F 5/10* (2013.01); *H01M 4/0404* (2013.01); *H01M 4/0485* (2013.01); *H01M 4/13* (2013.01); *H01M 4/134* (2013.01); *H01M 4/387* (2013.01); *H01M 4/523* (2013.01); *H01M 4/661* (2013.01); *H01M 4/801* (2013.01); *B22F 2003/242* (2013.01); *B22F 2201/01* (2013.01); *B22F 2201/03* (2013.01); *B22F 2301/205* (2013.01); *B22F 2301/35* (2013.01);
(Continued)

(58) Field of Classification Search
None
See application file for complete search history.

(56) References Cited

U.S. PATENT DOCUMENTS 4,362,647 A 12/1982 Torigai et al.
6,087,024 A * 7/2000 Whinnery .............. B22F 3/1125
264/42

(Continued)

FOREIGN PATENT DOCUMENTS

| JP | 2009199744 A | 3/2009 |
| KR | 1020040096381 | 1/2004 |
| KR | 101410061 B1 * | 6/2014 |

OTHER PUBLICATIONS

KR-101410061-B1 English Machine translation (Year: 2014).*
(Continued)

*Primary Examiner* — Scott J. Chmielecki
(74) *Attorney, Agent, or Firm* — Aka Chan LLP (57) ABSTRACT

A three-dimensional metallic foam is fabricated with an active oxide material for use as an anode for lithium batteries. The porous metal foam, which can be fabricated by a freeze-casting process, is used as the anode current collector of the lithium battery. The porous metal foam can be heat-treated to form an active oxide material to form on the surface of the metal foam. The oxide material acts as the three-dimensional active material that reacts with lithium ions during charging and discharging.

30 Claims, 13 Drawing Sheets

(51) Int. Cl.
- B22D 15/00 (2006.01)
- B22D 21/00 (2006.01)
- B22D 25/00 (2006.01)
- B22F 3/24 (2006.01)
- B22F 5/10 (2006.01)
- H01M 4/52 (2010.01)
- H01M 4/66 (2006.01)
- H01M 4/80 (2006.01)
- H01M 4/134 (2010.01)
- H01M 4/38 (2006.01)
- H01M 4/13 (2010.01)
- B22F 3/11 (2006.01)
- H01M 10/0525 (2010.01)
- H01M 4/02 (2006.01)

(52) U.S. Cl.
CPC ....... B22F 2998/10 (2013.01); B22F 2999/00 (2013.01); H01M 10/0525 (2013.01); H01M 2004/021 (2013.01)

(56) References Cited

U.S. PATENT DOCUMENTS

| | | |
|---|---|---|
| 2004/0219432 A1 | 4/2004 | Kojami |
| 2006/0231135 A1 | 10/2006 | Murai et al. |
| 2009/0029265 A1 | 1/2009 | Ota |
| 2010/0015490 A1 | 1/2010 | Yamada |
| 2010/0133110 A1 | 6/2010 | Nocera et al. |
| 2011/0059361 A1* | 3/2011 | Wilkening ............ H01M 4/136 429/218.1 |
| 2012/0121976 A1 | 5/2012 | Koshina |
| 2015/0072236 A1* | 3/2015 | Um ........................ C22C 1/0408 429/219 |
| 2017/0025230 A1* | 1/2017 | Kinpara ................. H01G 11/30 |

OTHER PUBLICATIONS

Carl A. Reiser et al., "A Reverse-Current Decay Mechanism for Fuel Cells," Electrochemical and Solid-State Letters, 2005, 8 (6) A273-A276 (2005), pp. A273-A276.

A. Bazylak et al., "Effect of compression on liquid water transport and microstructure of PEMFC gas diffusion layers," Journal of Power Sources 163 (2007), pp. 784-792.

W.R. Chang et al., "Effect of clamping pressure on the performance of a PEM fuel cell," Journal of Power Sources 166 (2007), pp. 149-154.

Jiabin Ge et al., "Effect of gas diffusion layer compression on PEM fuel cell performance," Journal of Power Sources 159 (2006), pp. 922-927.

Deville, Sylvain, Eduardo Saiz, and Antoni P. Tomsia. "Ice-templated Porous Alumina Structures." Acta Materialla 55.6 (2007): 1965-974. Web.

Wu, G., K. L. More, C. M. Johnston, and P. Zelenay. "High-Performance Electrocatalysts for Oxygen Reduction Derived from Polyaniline, Iron, Cobalt." Science 332.6028 (2011): 443-47. Web.

Fife, J.I., J.c. Li, D.c. Dunand, and P.w. Voorhees. "Morphological Analysis of Pores in Directionally Freeze-cast Titanium Foams." Journal of Materials Research J. Mater. Res. 24.01 (2009): 117-24. Web.

Jiang et al, Jul. 2010, "Surface-Nitrided Nickel with bifunctional structure as low-cost counter electrode for dye-sensitized solar cell.".

Richardson et al, "Crystalline size distribution of sintered Nickel catalysts," 1978.

* cited by examiner

METALLIC FOAM ANODE COATED WITH ACTIVE OXIDE MATERIAL

CROSS-REFERENCE TO RELATED APPLICATIONS

This patent application claims the benefit of U.S. patent applications 62/194,564 and 62/194,677, filed Jul. 20, 2016, which are incorporated by reference along with all other references cited in this application.

BACKGROUND OF THE INVENTION

The invention relates to the field of rechargeable battery technology and more specifically to rechargeable lithium-ion battery technology.

Among various types of secondary batteries, the lithium-ion battery (LIB) is an environmentally-friendly energy storage device that has a relatively high energy density and excellent cycle life. Lithium-ion battery technology generally uses graphite material for the anode and a metallic oxide material such as $LiCoO_2$ for the cathode.

Though graphite has been primarily used as the active material for the anode of the lithium-ion battery, its small specific capacity (372 milliamp-hours per gram) has limitations to next-generation applications that require a high energy density. Moreover, graphite also has a low transport rate and a corresponding low power density. Therefore, the graphite anode is not considered a promising solution to the battery applications that require both high capacity and power density.

In order to overcome the limitations, there have been significant efforts made to develop advanced anode and cathode materials. For example, high-capacity anode materials such as metal oxides and lithium alloys have been considered to substitute graphite. For the active material, transition metal oxides (TMO) including $Co_3O_4$, $Fe_2O_3$, $NiO$, $CuO$, and $TiO_2$ can be used. For example, some of the aforementioned oxide materials can insert and tally at least six lithium ions per chemical formula, showing a larger reversible capacity than that of graphite material. Such transition metal oxides react with lithium ions during the first discharging and form $Li_2O$ and follow a conversion reaction mechanism that reversibly come back to the initial state during the charging process.

However, these materials also show several problems. Some TMO's have poor capacity retention during lithium-ion insertion/extraction and poor rate capability, resulting in severe volume expansion. It is well known that the architectures of transition metal oxide and structure of current collector considerably influence electrochemical performance.

Therefore, there is a need for an improved lithium-ion battery having improved energy and power capabilities.

BRIEF SUMMARY OF THE INVENTION

A three-dimensional metal foam structure is fabricated with an oxide material coating for use as the anode of a lithium-ion battery. The fabrication technique is relatively simple and not complex. A coated metal foam anode reduces volume expansion of the active material and enhances the rate of electrochemical reactions, leading to improved cyclic performance and higher capacity of the anode material.

The present invention is intended to achieve the following: using porous metal foam with the pore size ranging from several hundred nanometers to several hundred microns to be used as a current collector of a lithium-ion battery; and forming an active oxide material layer with nano-scale surface roughness onto the surface of the porous metal foam.

A method of fabricating a porous metal foam and a method of coating an active material through high-temperature treatment are provided, which include the steps of: (a) freezing a metal slurry in a mold with a cold surface copper rod; (b) sublimating the frozen sample under reduced pressure and low temperature, forming a porous green-body; (c) sintering the porous green-body in order to get porous metal foam; (d) cutting the porous metal foam into thin layers; (e) forming an active oxide material layer by exposing the metal foam to a high-temperature heat-treatment.

The three-dimensional (3D) metallic foam with an active oxide material is structurally advantageous in restricting severe volume changes in the anode during cycling and in enhancing electrochemical reactions due to a larger surface area. As a result, a high capacity is expected.

In an implementation, a lithium battery device includes a porous metal foam current collector and active oxide material, which is formed on a surface of the porous metal foam current collector. The active oxide material can be an anode active material. The anode active material can be oxide-based materials including at least one of $Fe_2O_3$, $Fe_3O_4$, $Co_3O_4$, $CoO$, $SnO_2$, $Cu_2O$, $CuO$, $TiO_2$, or $NiO$.

The metal foam current collector can be made of at least one of the following metals: iron, cobalt, nickel, copper, titanium, gold, aluminum, magnesium, or stainless steel, or alloys of these. A manufacturing process can use a freeze-casting method to form the porous metal foam current collector.

The active material is oxide-based material can include at least one of $Fe_2O_3$, $Fe_3O_4$, $Co_3O_4$, $CoO$, $Cu_2O$, $CuO$, $NiO$, and $TiO_2$. And the current collector is three-dimensional porous metal-based material including at least one of iron, cobalt, copper, nickel, or titanium.

In an implementation, a method of making a porous metal foam using a freeze-casting process includes: placing a fluoropolymer resin or Teflon mold on a copper rod immersed in liquid nitrogen; pouring a metal slurry in the fluoropolymer resin mold with a freeze-casting setup; freezing the metal slurry, where ice dendrites form and grow in the metal slurry and metal or metal oxide particles pile up between growing ice crystals; forming a green-body metal foam with hollow pores by drying the ice crystals of the frozen metal slurry at low temperature and under reduced pressure; sintering the green-body metal foam at high temperature under an inert gas or hydrogen atmosphere to form the porous metal foam; and machining the porous metal foam into thin layers, where the thin layers of the porous metal foam can be applied as anode electrodes in lithium batteries. The metal slurry includes distilled water, binder, and metal or metal oxide powder. Teflon is a synthetic fluorine-containing resins or fluoropolymer resins. Teflon is a trademark of Chemours Company FC, LLC.

In an implementation, a method of fabricating a metal-foam anode for a lithium battery includes forming an active oxide material onto a surface of a metal foam current collector. A high-temperature heat-treatment is performed to form the active oxide material on the surface of the metal foam current collector. The heat-treatment is at a high temperature ranging from about 100 degrees Celsius to about 800 degrees Celsius in an air furnace. The heat-treatment is at a high temperature ranging from about 400 degrees Celsius to about 800 degrees Celsius in an air furnace. An additional carbon or ancillary material can be combined with the metal foam current collector and active oxide material.

In an implementation, a method includes: pouring a titanium metal slurry on a copper rod that is standing in vessel a under liquid nitrogen; freezing the metal slurry where the titanium metal particles are piled up and physically attached between the growing ice crystals; forming a porous green-body by drying the ice crystals of the frozen slurry at sufficiently low temperature and reduced pressure, leaving pores in their places with physical attachment; constructing the porous metal foam by reducing and sintering the porous green-body at sufficiently high temperature in a vacuum; and forming an anatase oxidation layer for porous metal foam by oxidizing in an air furnace.

In various implementations, the anatase oxidation layer may be formed by presoaking the porous metal foam in hydrogen peroxide (H2O2) at about 100 degrees Celsius (e.g., 100 degrees or more, 100 degrees or less, 55, 95, 105, or 150, plus or minus 5, 10, or 20, 25, 50, or 75 degrees, or plus or minus 1 percent, 2, percent, 5 percent, 10 percent, or 20 percent) for about 3 hours (e.g., 3 or fewer hours, or 3 or more hours, 1, 2, 4, 5, 7, or 8 hours, plus or minus 0.5, 1, or 2 hours, or plus or minus 1 percent, 2, percent, 5 percent, 10 percent, or 20 percent).

The sintering the porous green-body can include sintering or presintering at about 300 degrees Celsius (e.g., 300 degrees or more, 300 degrees or less, 200, 240, 245, 250, 295, 298, 305, 310, 325, 350, 380, or 400 degrees, plus or minus 5, 10, or 20, 25, 50, or 75 degrees, or plus or minus 1 percent, 2, percent, 5 percent, 10 percent, or 20 percent) for about 3 hours (e.g., 3 or fewer hours, 3 or more hours, 1, 2, 4, 5, 7, or 8 hours, plus or minus 0.5, 1, or 2 hours, or plus or minus 1 percent, 2, percent, 5 percent, 10 percent, or 20 percent); and sintering at about 1100 degrees Celsius (e.g., 1100 degrees or more, 1100 degrees or less, 1000, 1050, 1080, 1090, 1098, 1102, 1110, 1150, or 1200 degrees, plus or minus 5, 10, or 20, 25, 50, or 75 degrees, or plus or minus 1 percent, 2, percent, 5 percent, 10 percent, or 20 percent) for about 7 hours (e.g., 7 or fewer hours, 7 or more hours, 1, 2, 3, 5, 6, 9, or 10 hours, plus or minus 0.5, 1, 2, or 3 hours, or plus or minus 1 percent, 2, percent, 5 percent, 10 percent, or 20 percent).

The method can include: in a solution, dissolving polyvinyl alcohol in water; and adding titanium powder to the solution to form a titanium metal slurry. The forming of a porous green-body by drying the ice crystals occurs at about 0 degrees Celsius or less (e.g., 0 degrees or more, 0 or less degrees, plus or minus 5, 10, or 20 degrees, or plus or minus 1 percent, 2, percent, 5 percent, 10 percent, or 20 percent) for about 24 hours (e.g., 24 or fewer hours, 24 or more hours, 18, 19, 20, 22, 23, 25, 26, 28, or 30 hours, plus or minus 0.5, 1, 2, 3, 4, 5, 6, or 7 hours, or plus or minus 1 percent, 2, percent, 5 percent, 10 percent, or 20 percent).

In an implementation, a method includes: placing a mold on a copper rod into liquid nitrogen and pouring an iron metal slurry in the mold; freezing the iron metal slurry where the iron metal particles are piled up and physically attached between the growing ice crystals; forming a porous green-body by drying the ice crystals of the frozen slurry at sufficiently low temperature, leaving pores in their places with physical attachment; and constructing the porous metal foam by reducing and sintering the porous green-body at sufficiently high temperature under hydrogen atmosphere.

In various implementations, the sintering the porous green-body can include: sintering at about 300 degrees Celsius (e.g., 300 degrees or more, 300 degrees or less, 200, 240, 245, 250, 295, 298, 305, 310, 325, 350, 380, or 400 degrees, plus or minus 5, 10, or 20, 25, 50, or 75 degrees, or plus or minus 1 percent, 2, percent, 5 percent, 10 percent, or 20 percent) for about 2 hours (e.g., 2 or fewer hours, 2 or more hours, 1, 3, 4, 5, 7, or 8 hours, plus or minus 0.5, 1, or 1.5 hours, or plus or minus 1 percent, 2, percent, 5 percent, 10 percent, or 20 percent); and sintering at about 950 degrees Celsius (e.g., 950 degrees or more, 950 degrees or less, 900, 940, 945, 948, 952, 955, 995, 1000, or 1050 degrees, plus or minus 5, 10, or 20, 25, 50, or 75 degrees, or plus or minus 1 percent, 2, percent, 5 percent, 10 percent, or 20 percent) for about 2 hours (e.g., 2 or fewer hours, 2 or more hours, 1, 3, 4, 5, 7, or 8 hours, plus or minus 0.5, 1, or 1.5 hours, or plus or minus 1 percent, 2, percent, 5 percent, 10 percent, or 20 percent). The hydrogen atmosphere can include hydrogen (e.g., about 5 percent) and about 95 percent argon gas.

The forming a porous green-body can be by freeze drying at about −90 degrees Celsius (e.g., −90 degrees or more, −90 degrees or less, −90 degrees plus or minus 5, 10, or 20 degrees, or plus or minus 1 percent, 2, percent, 5 percent, 10 percent, or 20 percent) for about 48 hours (e.g., 48 or fewer hours, 48 or more hours, 38, 39, 40, 42, 43, 45, 46, 53, 55, 58, or 60 hours, plus or minus 0.5, 1, 2, 3, 4, 5, 6, or 7 hours, or plus or minus 1 percent, 2, percent, 5 percent, 10 percent, or 20 percent).

The copper rod can be at about −15 degrees Celsius (e.g., −15 degrees or more, −15 degrees or less, −15 degrees plus or minus 5, 10, or 20 degrees, or plus or minus 1 percent, 2, percent, 5 percent, 10 percent, or 20 percent).

In an implementation, a method includes: placing a mold on a copper rod into liquid nitrogen and pouring an cobalt metal slurry in the mold; freezing the cobalt metal slurry where the cobalt metal particles are piled up and physically attached between the growing ice crystals; forming a porous green-body by drying the ice crystals of the frozen slurry at sufficiently low temperature, leaving pores in their places with physical attachment; and constructing the porous metal foam by reducing and sintering the porous green-body at sufficiently high temperature under hydrogen atmosphere.

In various implementations, the sintering the porous green-body can include: sintering at about 550 degrees Celsius (e.g., 550 degrees or more, 550 degrees or less, 500, 540, 545, 555, 560, 580, 590, or 600 degrees, plus or minus 5, 10, or 20, 25, 50, or 75 degrees, or plus or minus 1 percent, 2, percent, 5 percent, 10 percent, or 20 percent) for about 4 hours (e.g., 4 or fewer hours, 4 or more hours, 1, 2, 3, 5, 7, or 8 hours, plus or minus 0.5, 1, 2, or 3 hours, or plus or minus 1 percent, 2, percent, 5 percent, 10 percent, or 20 percent); and sintering at about 1000 degrees Celsius (e.g., 1000 degrees or more, 1000 degrees or less, 900, 940, 945, 948, 952, 955, 995, 1000, 1105, 1110, 1050, or 1100 degrees, plus or minus 5, 10, or 20, 25, 50, or 75 degrees, or plus or minus 1 percent, 2, percent, 5 percent, 10 percent, or 20 percent) for about 9 hours (e.g., 9 or fewer hours, 9 or more hours, 1, 2, 3, 5, 7, 8, 10, 11, or 12 hours, plus or minus 0.5, 1, 2, 3, 4, 5, or 6 hours, or plus or minus 1 percent, 2, percent, 5 percent, 10 percent, or 20 percent).

The hydrogen atmosphere can have about 5 percent hydrogen gas (e.g., 5 or more percent, 5 or less percent, 1, 2, 3, 4, 6, 7, 8, 9, or percent, or plus or minus 0.25, 0.5, 1, 1.5, 2, or 3 percent). The forming of a porous green-body can include freeze drying at about −88 degrees Celsius (e.g., −88 degrees or more, −88 degrees or less, −88 degrees plus or minus 5, 10, or 20 degrees, or plus or minus 1 percent, 2, percent, 5 percent, 10 percent, or 20 percent) for about 24 hours (e.g., 24 or fewer hours, 24 or more hours, 18, 19, 20, 22, 23, 25, 26, 28, or 30 hours, plus or minus 0.5, 1, 2, 3, 4, 5, 6, or 7 hours, or plus or minus 1 percent, 2, percent, 5 percent, 10 percent, or 20 percent). For freezing, the copper rod can be at about −10 degrees Celsius (e.g., −10 degrees or more, −10 degrees or less, −10 degrees plus or minus 5, 10, or 20 degrees, or plus or minus 1 percent, 2, percent, 5 percent, 10 percent, or 20 percent).

Other objects, features, and advantages of the present invention will become apparent upon consideration of the following detailed description and the accompanying drawings, in which like reference designations represent like features throughout the figures.

DETAILED DESCRIPTION OF THE INVENTION

A metal foam structure is fabricated for use as the anode of lithium-ion battery. A method includes: fabricating a porous metal foam with pore size ranging from several nanometers to several hundred microns as the current collector; and forming an active oxide material layer through a heat-treatment, which charges and discharges lithium ions.

Figure 1A:
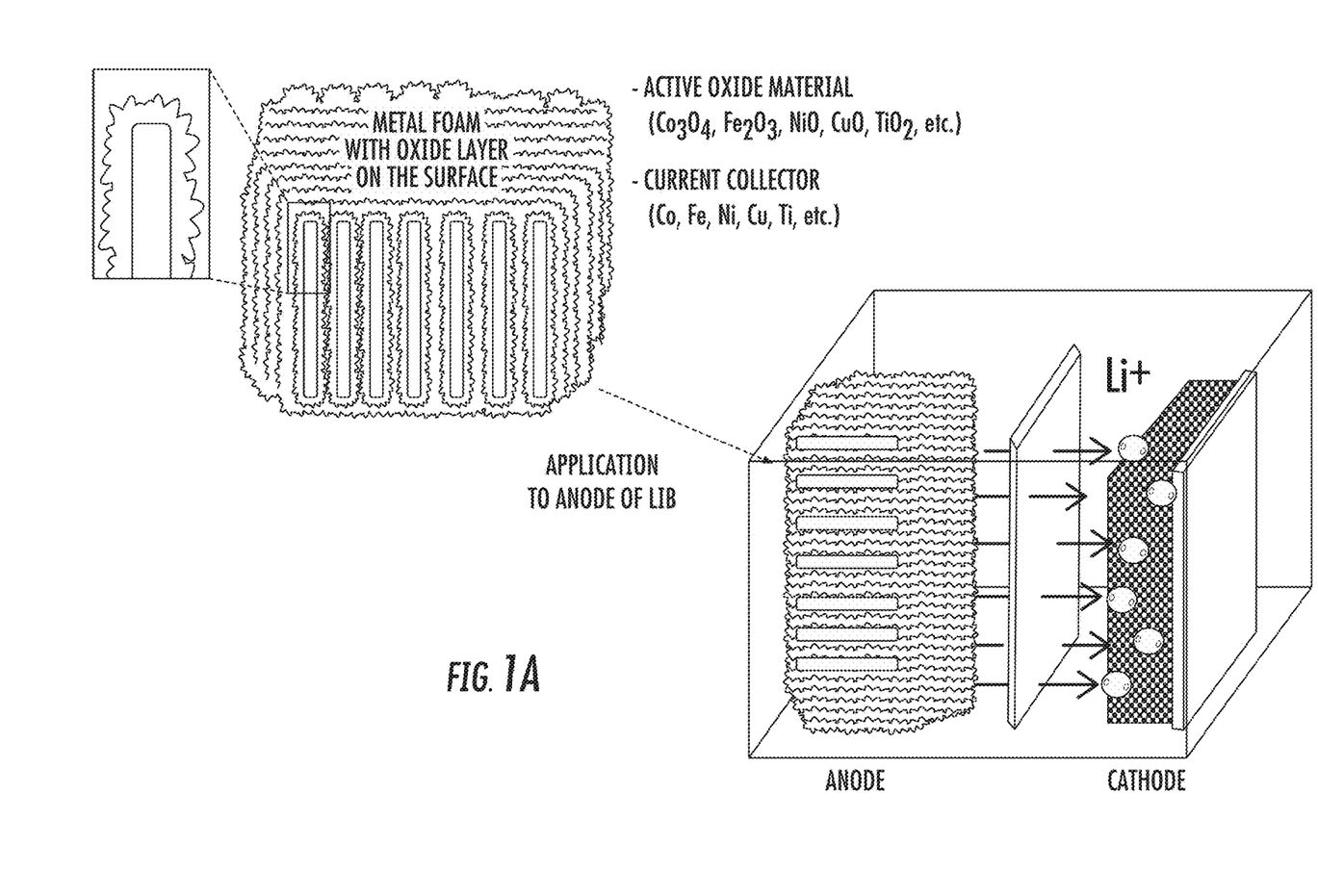
FIG. 1A is an illustration of an anode electrode made of three-dimensional metallic foam with an active oxide material.

FIG. 1A shows an embodiment of the present invention which describes the formation of an active oxide material layer with nanoscale surface roughness on the surface of porous metal foam for use as a current collector of a lithium-ion battery. In a specific implementation, the current collector of the lithium-ion battery is an anode current collector. The current collector is made of multiple porous metal foam plates with an active oxide material layer surrounding the multiple plates. The surface area of the anode current collector is thus increased and can expedite electrochemical reactions at a greater rate as well as store more lithium ions than that of a conventional anode current collector.

A technique of fabricating a three-dimensional porous anode electrode is described in U.S. patent application 62/194,564, filed Jul. 20, 2015, which is incorporated by reference along with all other references cited in this application.

Porous metal can be fabricated according to a number of techniques. In an implementation, the porous metal foam has a three-dimensional porous structure fabricated through a freeze-casting method. For example, three-dimensional copper foam is fabricated through a freeze-casting method as an example manufacturing process. U.S. patent application Ser. No. 13/930,887 describes a freeze-casting technique and is incorporated by reference. This process features a simple, low-cost processing method to fabricate porous structures. An active oxide material with nanoscale surface roughness is formed on the surface of the porous metal foam, which can be used as the current collector.

Specific flow implementations are presented in this patent, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on other factors.

Figure 1B:
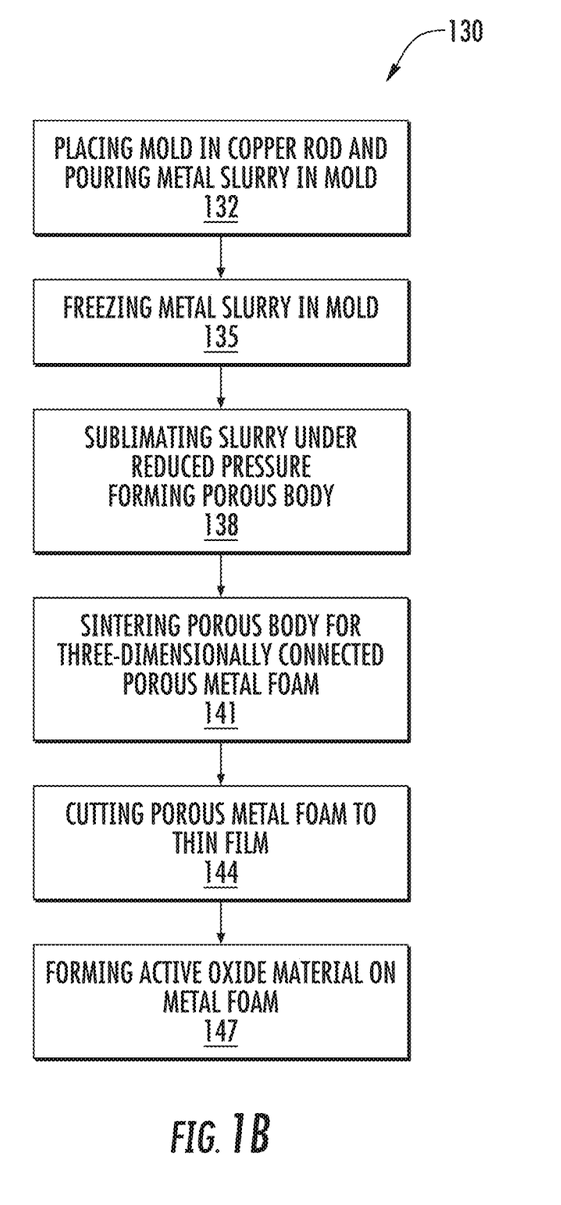
FIG. 1B shows a flow diagram of fabricating an electrode made of a metal foam with an active oxide material.

FIG. 1B shows a detailed method 130 of fabricating the porous metal foam and forming the metal oxide layer includes:

(a) Referring to a step 132, immersing a copper rod (with high thermal conductivity) into liquid nitrogen and pouring a metal slurry in a mold with a freeze-cast setup.

(b) Referring to a step 135, freezing the metal slurry, where the metal particles are piled up between the growing ice crystals.

(c) Referring to a step 138, forming a porous structure by drying the ice crystals of the frozen sample at low temperature and reduced pressure, leaving pores in their place.

(d) Referring to a step 141, forming the three-dimensionally connected porous metal foam by sintering the porous structure under hydrogen atmosphere.

(e) Referring to a step 144, cutting the porous metal foam into a thin layer to be applied as the current collector for the anode of a lithium-ion battery.

(f) Referring to a step 147, forming an active oxide material layer on the surface of metal foam for use as the current collector of the anode of lithium-ion battery through heat-treatment. The oxide material that is formed can be $Co_3O_4$, $CoO$, $Fe_2O_3$, $Fe_3O_4$, $CuO$, $Cu_2O$, $NiO$, or $TiO_2$ as the anode active material.

In the present invention, three example embodiments are provided: cobalt, titanium, and iron foams with oxide layers formed on their surfaces. The choice of the metallic foam, however, is not limited to them, but is open to other metallic materials, such as copper, nickel foams, and others. The metal foam can be used as a three-dimensional current collector with high electrical conductivity and mass transport efficiency.

Some specific embodiments are presented below. These embodiments are provided only to describe some examples of detailed implementations, and it will be apparent to those skilled in the art to that the scope of the present invention is not limited by the embodiments.

Exemplary Embodiment 1 (Three-Dimensional Porous Iron Oxide or Iron Anode)

Iron foam is selected as a model material for the confirmation of this implementation and is fabricated by a freeze-casting process. A metal slurry is prepared by mixing iron oxide powder with deionized water and binder. The iron oxide powder is well dispersed in the slurry by a combination of stirring and sonication processes. The slurry is then poured into a fluoropolymer resin or Teflon mold onto the copper rod, which is cooled using liquid nitrogen (N2). The temperature of the top of the copper rod is controlled by a heater and is fixed at −15 degrees Celsius.

After freezing, the frozen slurry is freeze-dried at −90 degrees Celsius for about two days (e.g., about 48 hours), forming a porous green-body. The green-body is reduced and sintered in a tube furnace in hydrogen (H2)—95 percent argon gas mixture. The reduction is performed step-by-step both at 300 degrees Celsius for 2 hours and at 500 degrees Celsius for 2 hours, and the sintering is performed at 950 degrees Celsius for 14 hours.

Figure 2:
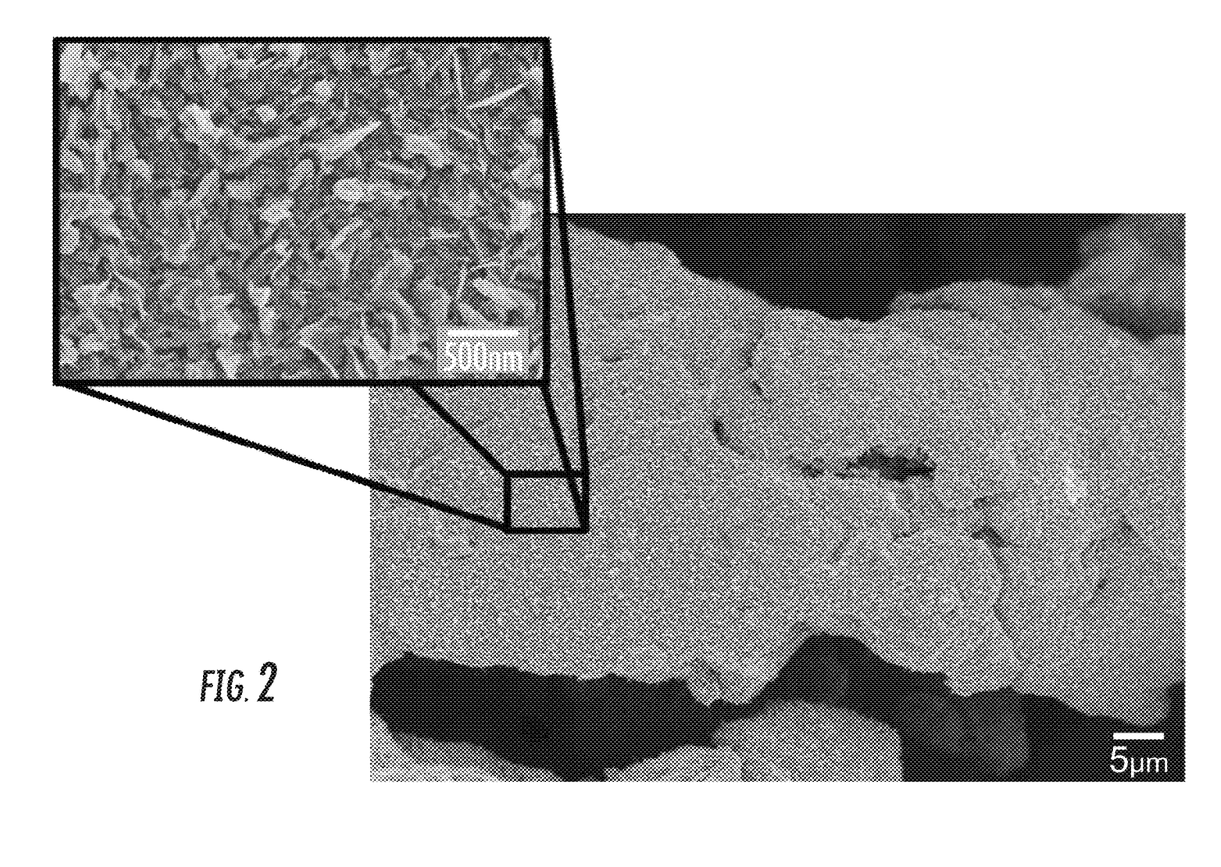
FIG. 2 is a scanning electron microscope (SEM) micrograph of three-dimensional iron foam with an active iron oxide layer formed on the surface of the iron.
Figure 3:
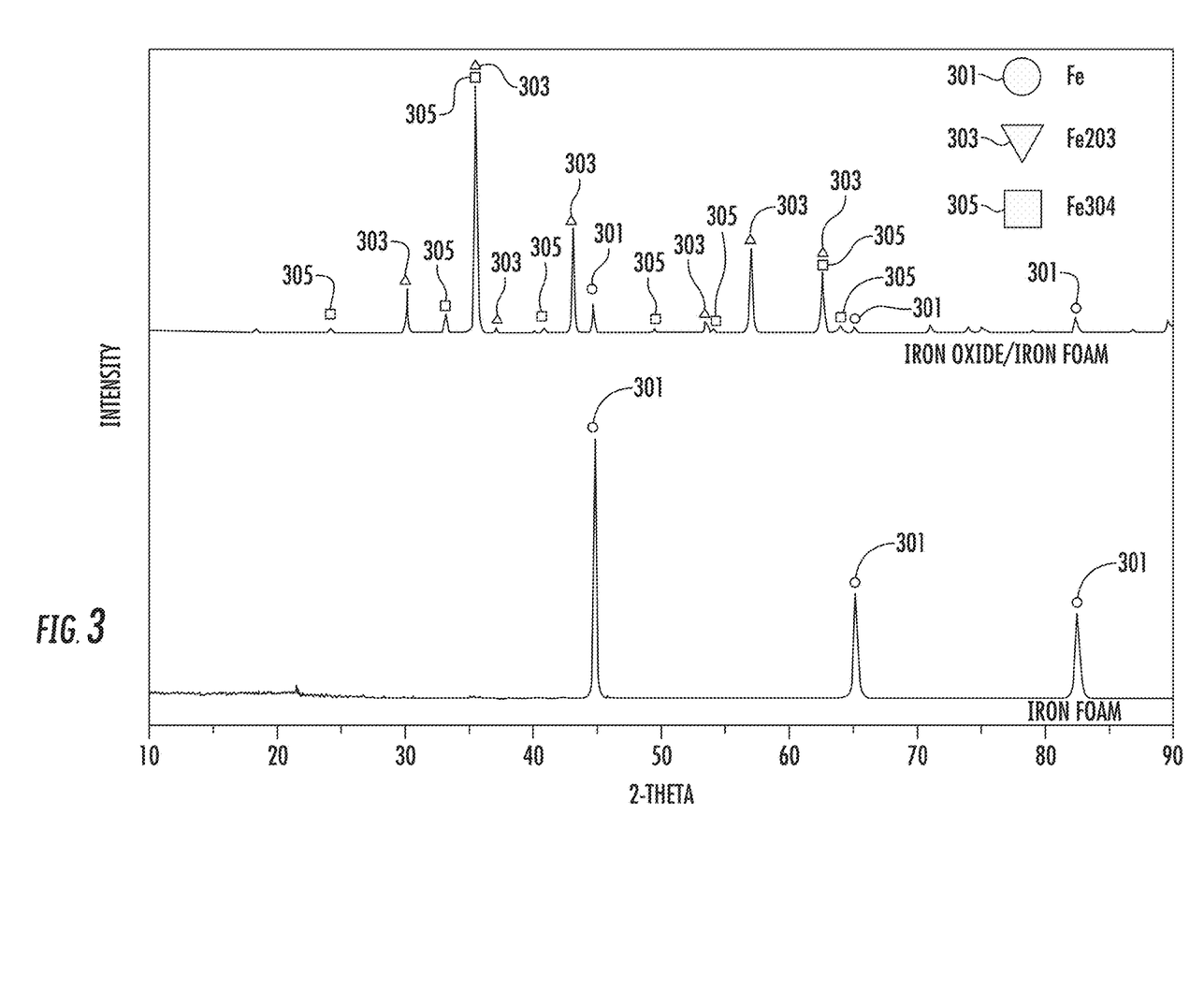
FIG. 3 is an X-ray diffraction (XRD) spectrum of the three-dimensional iron foam confirming that pure iron oxide layer is formed on the surface of the iron foam.

FIG. 2 shows an SEM micrograph of three-dimensional iron foam with an active iron oxide layer formed on the surface of the iron foam. FIG. 3 shows an XRD spectrum of the three-dimensional iron foam confirming that pure iron oxide layer is formed on the surface of the iron foam and has higher peak intensities than that of iron foam without the iron oxide layer.

Exemplary Embodiment 2 (Three-Dimensional Porous Titanium Oxide or Titanium Anode)

Titanium foam is selected as a model material and is fabricated by a freeze-casting process. Prior to freeze-casting, polyvinyl alcohol (PVA) is dissolved in distilled water, and titanium powder is added to the prepared solution to complete the slurry. The slurry is then poured directly onto the top of a copper chiller rod standing in a stainless steel vessel under liquid nitrogen (N2).

A frozen green-body is lyophilized to remove ice through sublimation at a subzero temperature (e.g., less than 0 degrees Celsius) for about a day (e.g., about 24 hours). The lyophilized green-body is then sintered in a vacuum furnace via a two-step heat-treatment process: at 300 degrees Celsius for 3 hours and then at 1100 degrees Celsius for 7 hours.

Finally, for the formation of anatase oxidation layer, titanium foam is presoaked in hydrogen peroxide (H2O2) at 100 degrees Celsius for 3 hours. Titanium foam is then oxidized in an air furnace at 400 degrees Celsius for 6 hours.

Figure 4:
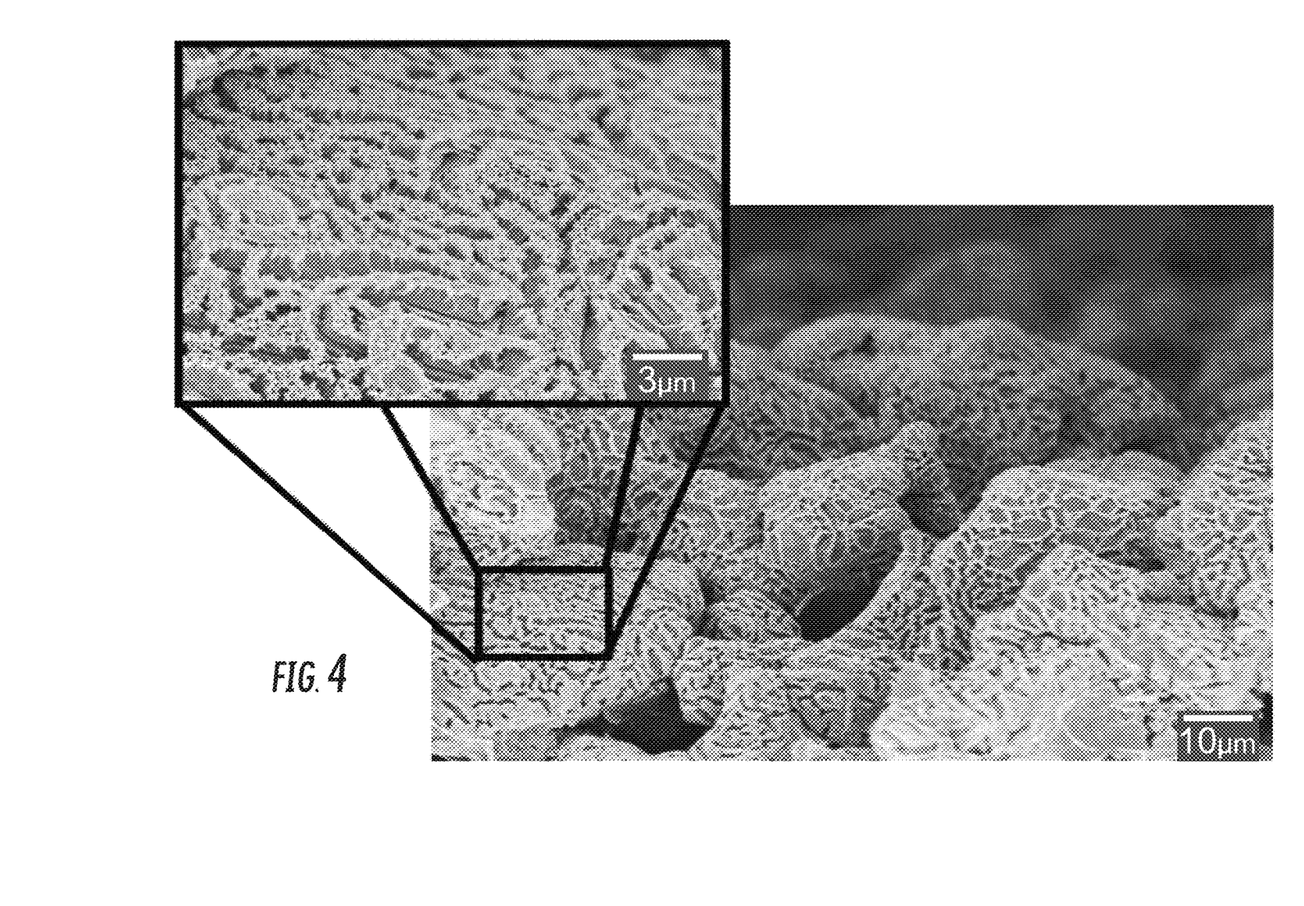
FIG. 4 is an SEM micrograph of three-dimensional titanium foam with an active titanium oxide layer formed on the surface of the titanium.
Figure 5:
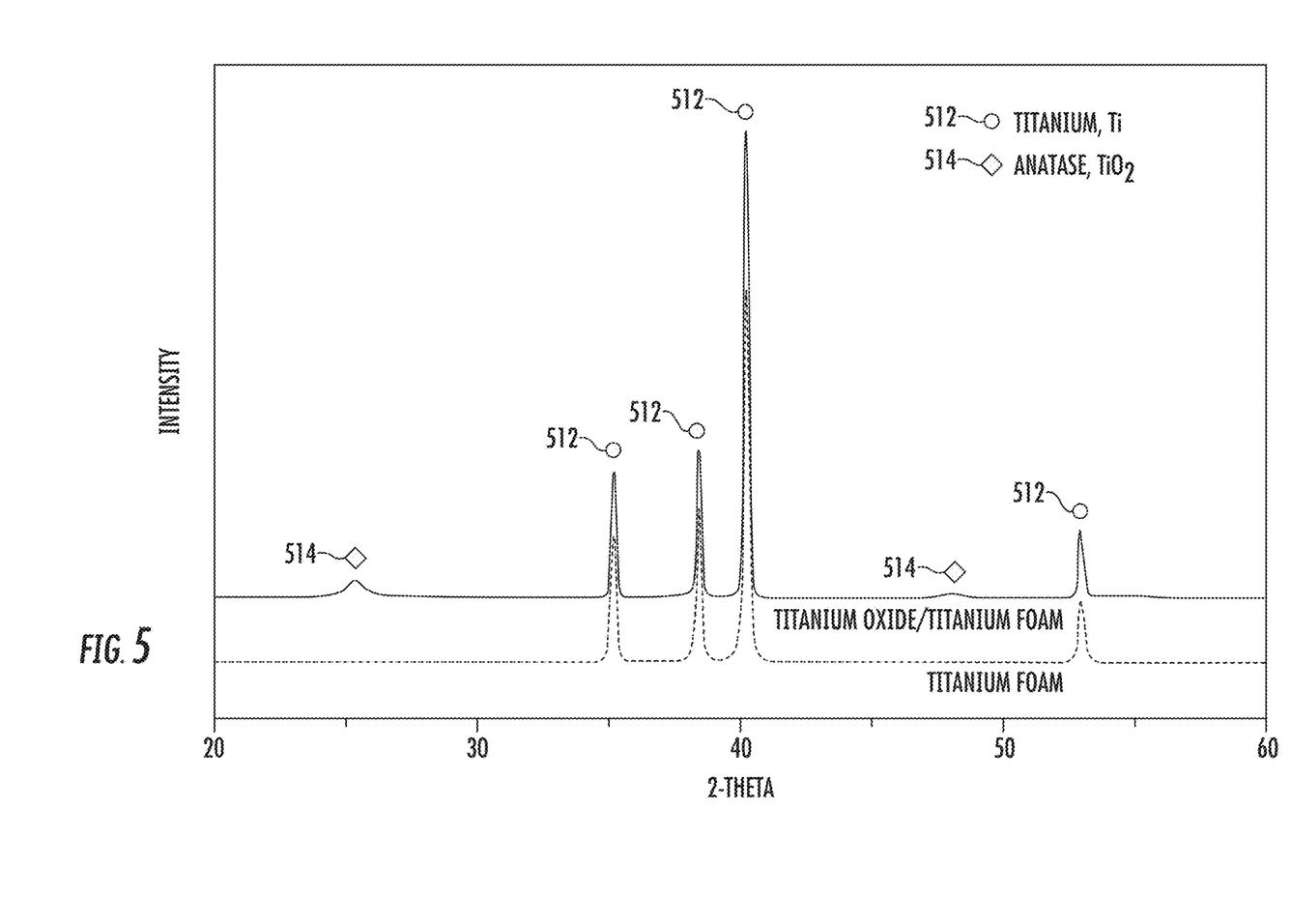
FIG. 5 is an XRD spectrum of the three-dimensional titanium foam confirming that pure titanium oxide layer is formed on the surface of the titanium foam.

FIG. 4 shows SEM micrograph of three-dimensional titanium foam with an active titanium oxide layer formed on the surface of the titanium foam. FIG. 5 is an XRD spectrum of the three-dimensional titanium foam confirming that pure titanium oxide layer is formed on the surface of the titanium foam and has higher peak intensities than that of titanium foam without the titanium oxide layer.

Exemplary Embodiment 3 (Three-Dimensional Porous Cobalt Oxide or Cobalt Anode)

Cobalt powder slurry based on 30 milliliters of deionized water consists of 7 volume percent cobalt oxide powder and 8 weight percent PVA binder. The slurry is dissolved by using a combination of stirring and sonication to improve the degree of dispersion. The slurry is then poured into a fluoropolymer resin or Teflon mold onto a copper rod. The temperature of the top of the copper rod is fixed at −10 degrees Celsius by liquid nitrogen and a heater.

After the slurry is completely frozen, the frozen sample is sublimated at −88 degrees Celsius for 24 hours in a freeze dryer in vacuum, resulting in the removal of ice crystals, forming a green-body with directional pores. The green body is then reduced from cobalt oxide to cobalt in hydrogen atmosphere and then sintered. The reduction and sintering processes consist of pre-sintering at 550 degrees Celsius for 4 hours and actual sintering at 1000 degrees Celsius for 9 hours in a tube furnace under a 5 percent hydrogen mixture gas.

Figure 6:
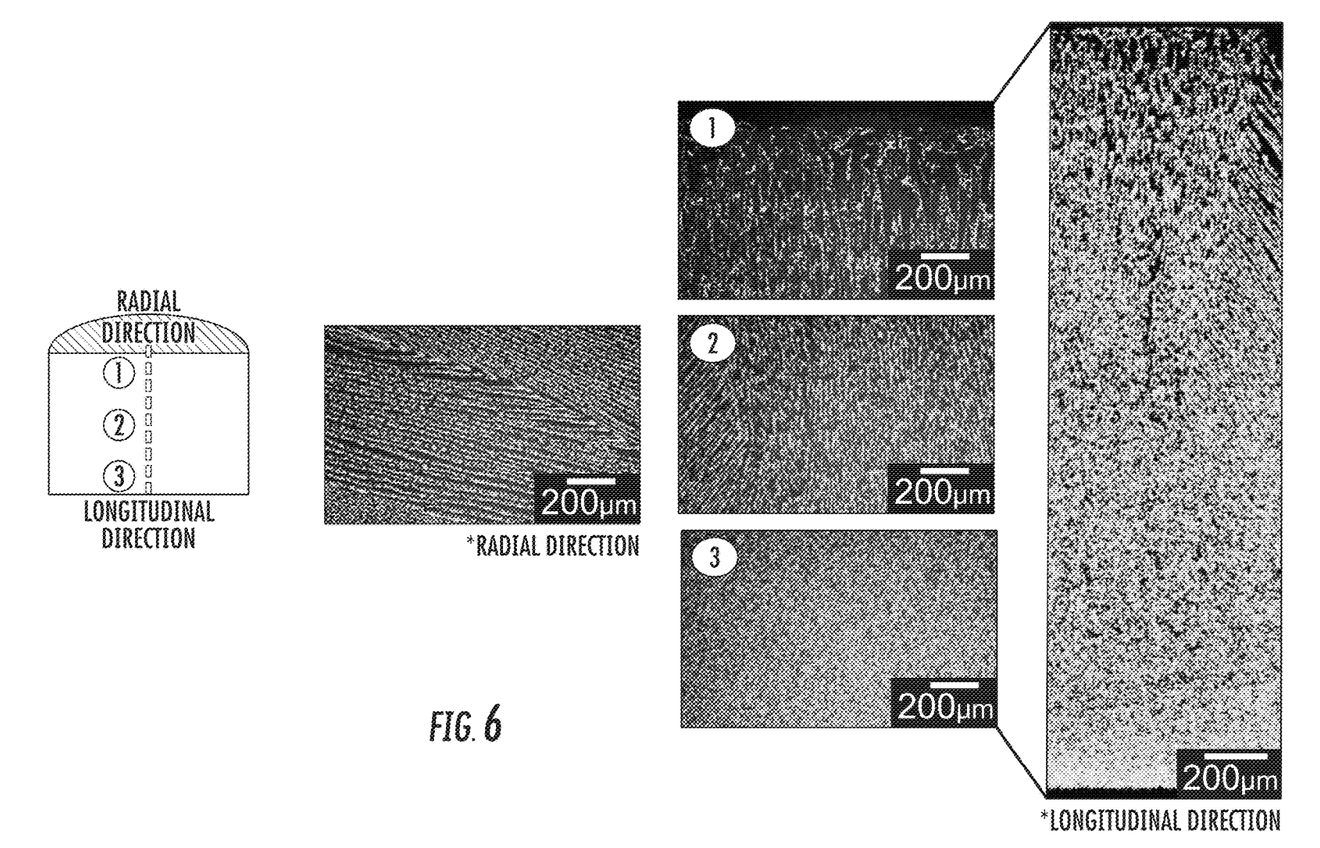
FIG. 6 shows optical micrographs of mounted and polished top- and cross-sections of three-dimensional cobalt foam.
Figure 7A:
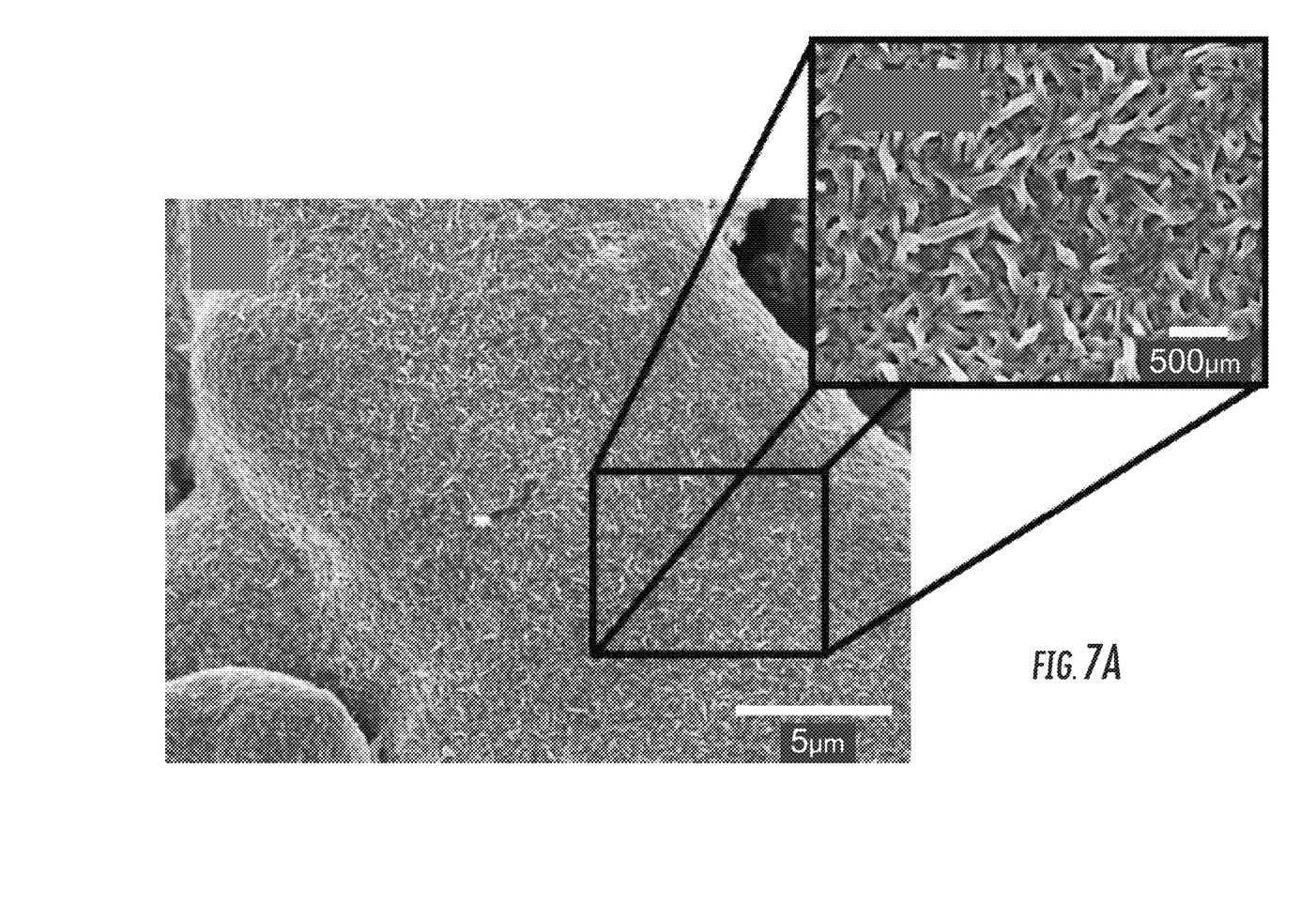
FIGS. 7A-7C show SEM micrographs and an energy dispersive X-ray (EDX) spectrum of the three-dimensional cobalt foam with an active cobalt oxide layer formed on the surface.
Figure 7B:
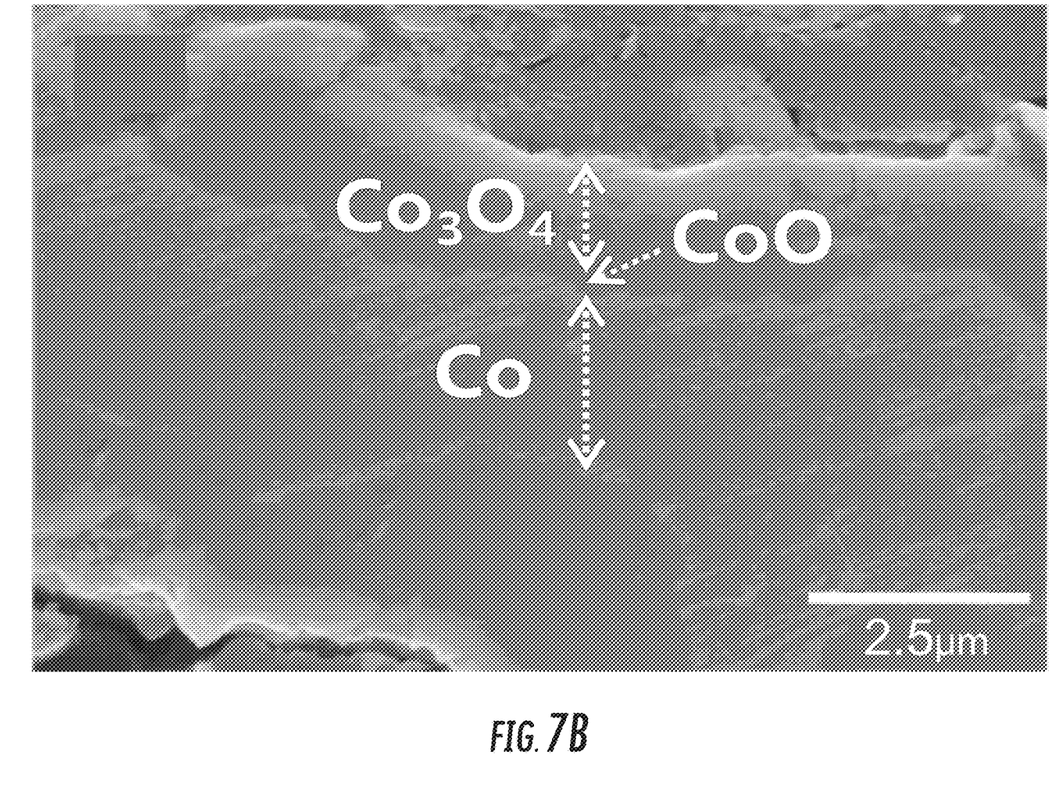
Figure 7C:
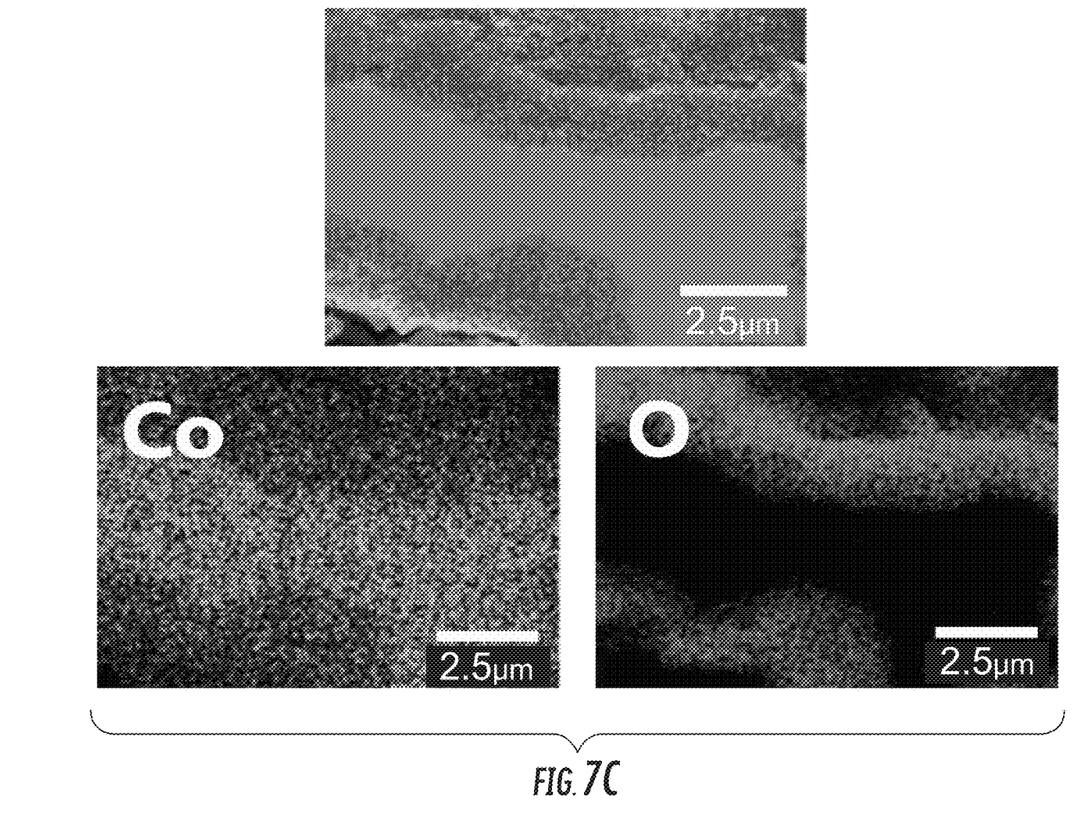

FIG. 6 shows optical micrographs of mounted and polished top- and cross-sections of three-dimensional cobalt foam (radial and longitudinal views). More specifically, FIG. 6 shows that the cobalt foam is indeed a three-dimensional architecture with regularly distributed lamellar structured pores on the orders of several tens of microns. FIGS. 7A-7C also show that a cobalt oxide layer with nanoscale surface roughness is formed on the surface of the cobalt foam as confirmed by both SEM images and energy dispersive X-ray mapping.

Figure 8:
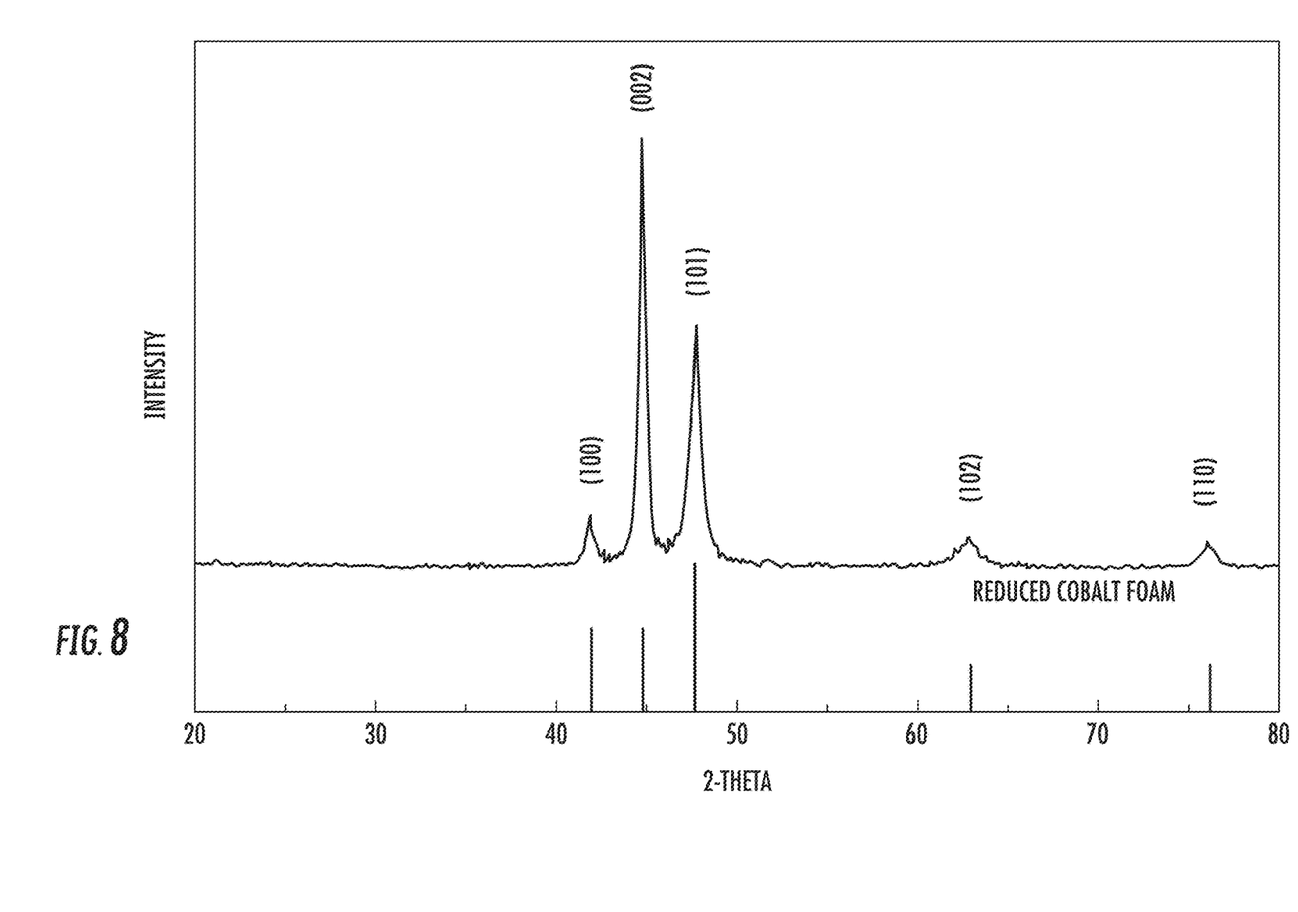
FIG. 8 shows an XRD spectrum of the three-dimensional cobalt foam.
Figure 9:
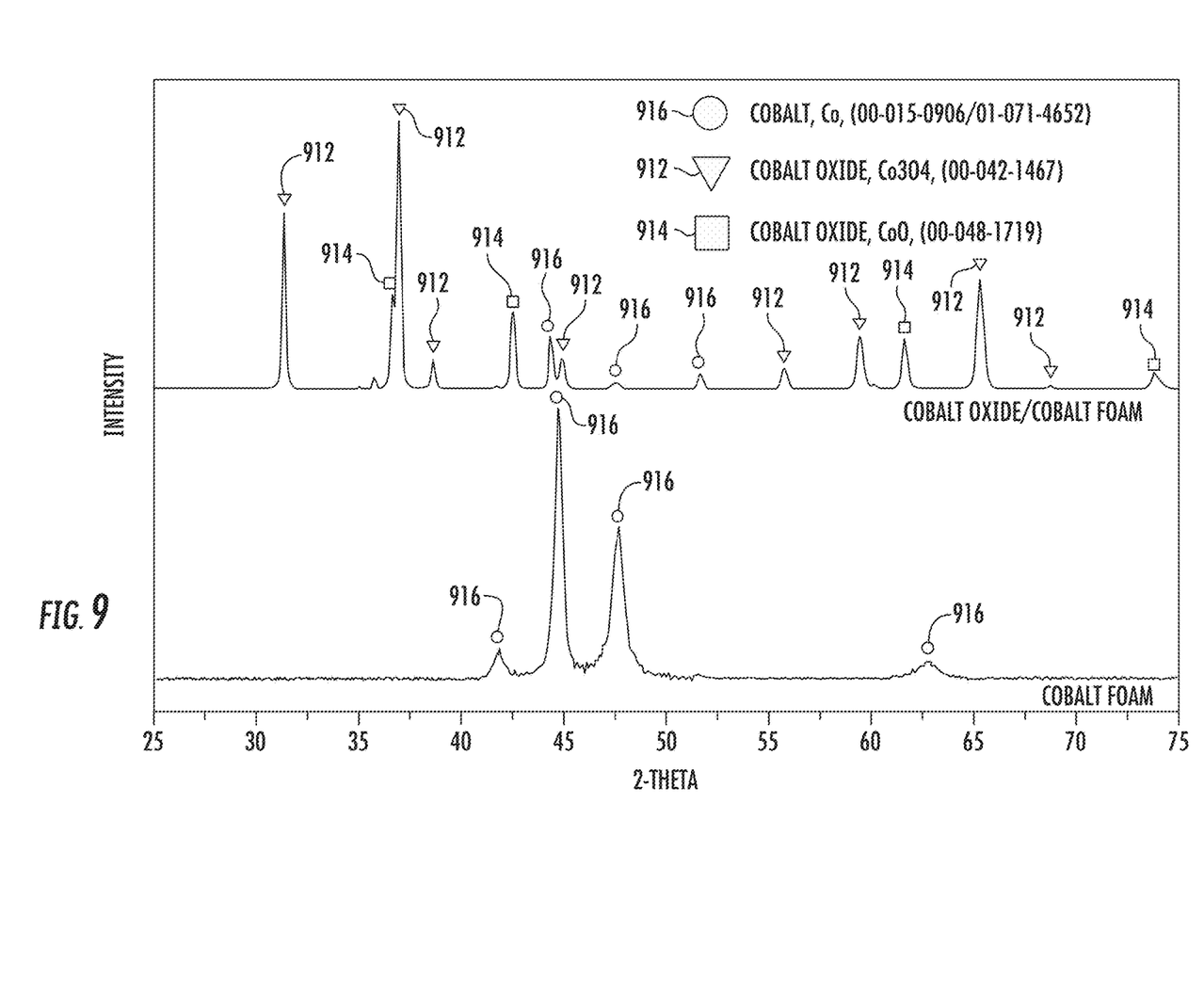
FIG. 9 shows an XRD spectrum of the three-dimensional cobalt foam with an active cobalt oxide layer formed on the surface.

FIG. 8 is an XRD spectrum of the three-dimensional cobalt foam. FIG. 9, shows an XRD pattern for the three-dimensional porous cobalt foam heat-treated at 600 degrees Celsius and verifies the formation of both $Co_3O_4$ and $CoO$ phases on the surface of cobalt foam and that both cobalt oxides have higher peak intensities than that of pure cobalt foam as shown in FIGS. 7A-7C. In particular, cobalt demonstrates that the anode system, which consists of a cobalt foam current collector and a cobalt oxide active material, can show superior coin-cell performance.

Figure 10:
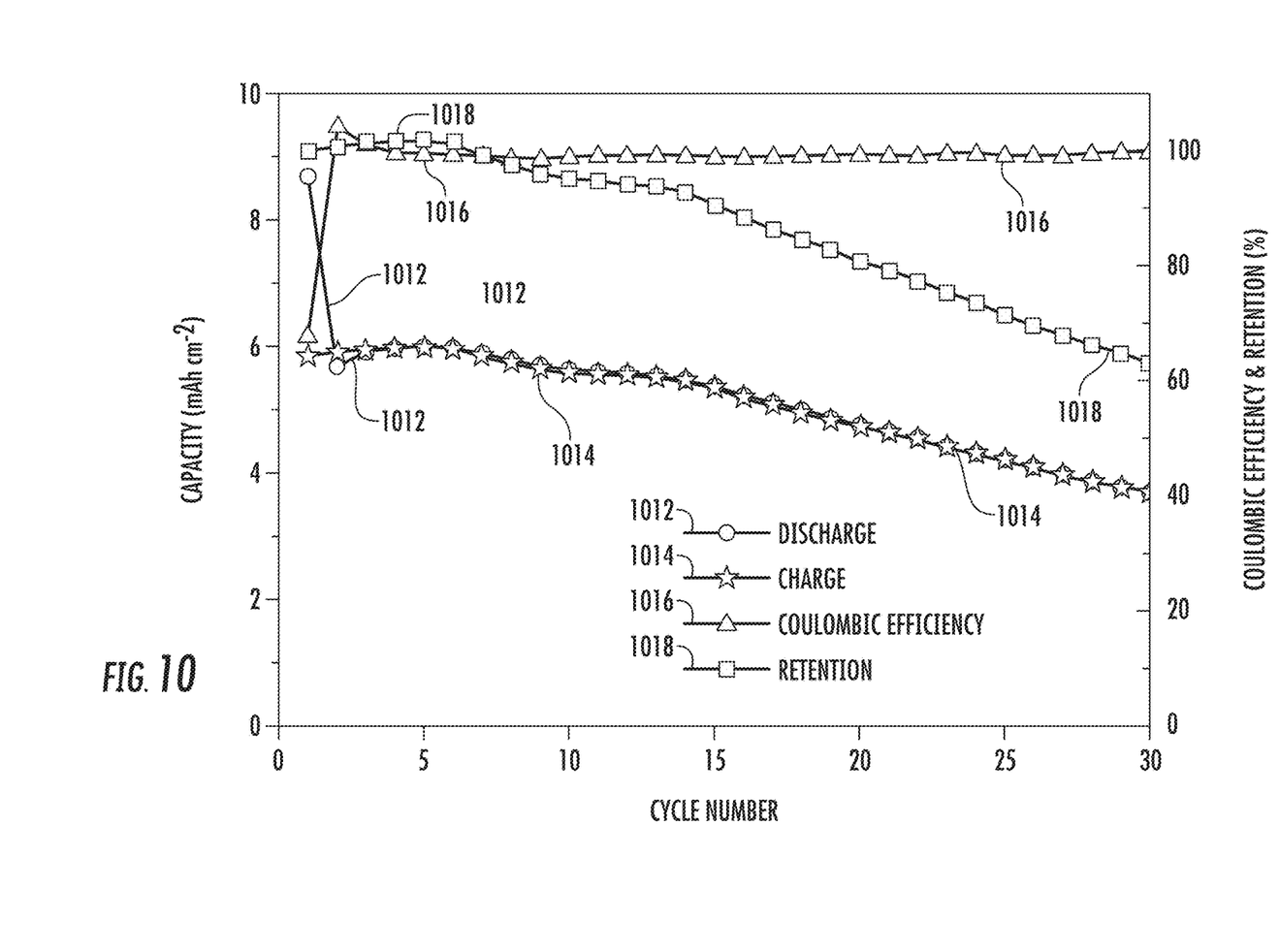
FIG. 10 shows the cycle performance and Coulombic efficiency of the three-dimensional cobalt foam with an active oxide layer formed on its surface.

FIG. 10 shows the cyclic performance of the three-dimensional porous cobalt foam heat-treated at 600 degrees Celsius, confirming that the three-dimensional porous cobalt foam fabricated in this invention is indeed applicable for use as the anode of a lithium-ion battery. The initial discharge capacity of the three-dimensional porous cobalt foam heat-treated at 600 degrees Celsius is 8.7 milliamp-hours per square centimeter, which is higher than the conventional anode. Furthermore, the Coulombic efficiency of the three-dimensional porous cobalt foam heat-treated at 600 degrees Celsius is also high, maintaining near 99.8 percent charge after the 30th cycle.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
   placing a mold on a copper rod into liquid nitrogen and pouring an iron metal slurry in the mold;
   freezing the iron metal slurry where iron metal particles are piled up and physically attached between the growing ice crystals;
   forming a porous green-body by drying the ice crystals of the frozen slurry at a sufficiently low temperature, leaving pores in their places with physical attachment, wherein the sufficiently low temperature comprises any temperature at or below freezing; and
   constructing a porous metal foam by reducing and sintering the porous green-body at a sufficiently high temperature under an atmosphere comprising hydrogen, wherein the reducing and sintering the porous green-body comprises:
reducing at about 300 degrees Celsius for about 2 hours; and
sintering at about 950 degrees Celsius for about 14 hours.

2. The method of claim 1 wherein the atmosphere comprises hydrogen and about 95 percent argon gas.

3. The method of claim 1 wherein the forming a porous green-body comprises:
freeze drying at about −90 degrees Celsius for about 48 hours.

4. The method of claim 1 wherein the copper rod is about −15 degrees Celsius.

5. A method comprising:
placing a mold on a copper rod into liquid nitrogen and pouring an iron metal slurry in the mold;
freezing the iron metal slurry where iron metal particles are piled up and physically attached between the growing ice crystals;
forming a porous green-body by drying the ice crystals of the frozen slurry at a sufficiently low temperature, leaving pores in their places with physical attachment, wherein the sufficiently low temperature comprises any temperature at or below freezing; and
constructing a porous metal foam by reducing and sintering the porous green-body at a sufficiently high temperature under an atmosphere comprising hydrogen, wherein the reducing and sintering the porous green-body comprises:
reducing at a first temperature for about a T1 time period; and
after the reducing, sintering at a second temperature for a T2 time period, wherein the second temperature is greater than the first temperature, and the T2 time period is greater than the T1 time period.

6. A method comprising:
placing a mold on a copper rod into liquid nitrogen and pouring an iron metal slurry in the mold;
freezing the iron metal slurry where iron metal particles are piled up and physically attached between the growing ice crystals;
forming a porous green-body by drying the ice crystals of the frozen slurry at a sufficiently low temperature, leaving pores in their places with physical attachment, wherein the sufficiently low temperature comprises any temperature at or below freezing; and
constructing a porous metal foam by reducing and sintering the porous green-body at a sufficiently high temperature under an atmosphere comprising hydrogen, wherein the reducing and sintering the porous green-body comprises:
reducing at a first temperature for about a T1 time period; and
after the reducing at the first temperature, reducing at a second temperature for a T2 time period.

7. The method of claim 6 comprising:
after the reducing at the second temperature, sintering at a third temperature for a T3 time period, wherein the third temperature is greater than the second temperature, and the second temperature is greater than the first temperature.

8. The method of claim 7 wherein T3 is greater than T2, and T2 is the same as T1.

9. The method of claim 1 wherein the reducing and sintering the porous green-body comprises:
after the reducing at about 300 degrees Celsius for about 2 hours, reducing at about 500 degrees Celsius for about 2 hours.

10. The method of claim 1 wherein a top of the copper rod in the liquid nitrogen is controlled by a heater to be at a temperature above a temperature of the liquid nitrogen.

11. The method of claim 1 comprising:
preparing the iron metal slurry by combining an iron oxide powder with deionized water and a binder; and
dispersing the iron oxide powder in the slurry by stirring and sonification.

12. The method of claim 5 wherein the reducing and sintering the porous green-body comprises:
after the reducing at the first temperature, reducing at a third temperature for a T3 time period.

13. The method of claim 12 wherein T2 is the same as T1.

14. The method of claim 12 wherein the third temperature is greater than the first temperature.

15. The method of claim 5 wherein a top of the copper rod in the liquid nitrogen is controlled by a heater to be at a temperature above a temperature of the liquid nitrogen.

16. The method of claim 5 comprising:
preparing the iron metal slurry by combining an iron oxide powder with deionized water and a binder; and
dispersing the iron oxide powder in the slurry by stirring and sonification.

17. The method of claim 5 wherein the atmosphere comprises hydrogen and about 95 percent argon gas.

18. The method of claim 5 wherein the forming a porous green-body comprises:
freeze drying at a third temperature for a T3 time period.

19. The method of claim 6 wherein the second temperature is greater than the first temperature.

20. The method of claim 6 wherein T2 is the same as T1.

21. The method of claim 19 wherein T2 is the same as T1.

22. The method of claim 6 wherein a top of the copper rod in the liquid nitrogen is controlled by a heater to be at a temperature above a temperature of the liquid nitrogen.

23. The method of claim 6 comprising:
preparing the iron metal slurry by combining an iron oxide powder with deionized water and a binder; and
dispersing the iron oxide powder in the slurry by stirring and sonification.

24. The method of claim 6 comprising:
after the reducing at the second temperature, sintering at a third temperature for a T3 time period.

25. The method of claim 24 wherein the third temperature is greater than the second temperature.

26. The method of claim 24 wherein the second temperature is greater than the first temperature.

27. The method of claim 24 wherein T3 is greater than T2.

28. The method of claim 24 wherein T2 is the same as T1.

29. The method of claim 6 wherein the atmosphere comprises hydrogen and about 95 percent argon gas.

30. The method of claim 6 wherein the forming a porous green-body comprises:
freeze drying at a third temperature for a T3 time period.

* * * * *